United States Patent
Guignon et al.

(10) Patent No.: US 9,846,524 B2
(45) Date of Patent: Dec. 19, 2017

(54) METHOD FOR SELECTING AN ITEM IN A LIST

(71) Applicant: ORANGE, Paris (FR)

(72) Inventors: Richard Guignon, Amanlis (FR); Olivier Thunin, Louannec (FR)

(73) Assignee: ORANGE SA, Paris (FR)

( * ) Notice: Subject to any disclaimer, the term of this patent is extended or adjusted under 35 U.S.C. 154(b) by 238 days.

(21) Appl. No.: 14/731,214

(22) Filed: Jun. 4, 2015

(65) Prior Publication Data
US 2015/0363052 A1  Dec. 17, 2015

(30) Foreign Application Priority Data

Jun. 17, 2014   (FR) .................................. 14 55546

(51) Int. Cl.
| | | |
|---|---|---|
| *G06F 3/048* | (2013.01) | |
| *G06F 3/0482* | (2013.01) | |
| *G06F 3/0484* | (2013.01) | |
| *G06F 3/0485* | (2013.01) | |
| *G06F 3/0488* | (2013.01) | |

(52) U.S. Cl.
CPC .......... *G06F 3/0482* (2013.01); *G06F 3/0485* (2013.01); *G06F 3/0488* (2013.01); *G06F 3/04842* (2013.01)

(58) Field of Classification Search
CPC .................................................. G06F 3/0482
USPC ......................................................... 715/830
See application file for complete search history.

(56) References Cited

U.S. PATENT DOCUMENTS

| | | | | |
|---|---|---|---|---|
| 7,856,602 B2* | 12/2010 | Armstrong | ........... | G06F 3/0482 715/774 |
| 8,341,551 B2* | 12/2012 | Lee | ........ | G06F 1/1626 715/810 |
| 8,701,044 B2* | 4/2014 | Kolletzki | ............. | G06F 3/0362 715/716 |
| 8,819,597 B2* | 8/2014 | Li | ........ | G06F 3/0482 715/263 |
| 8,984,436 B1* | 3/2015 | Tseng | .......... | G06F 1/1624 345/173 |
| 9,015,616 B2* | 4/2015 | Tseng | ........... | G06F 1/1624 345/168 |

(Continued)

FOREIGN PATENT DOCUMENTS

| | | |
|---|---|---|
| EP | 2 487 613 A1 | 8/2015 |
| WO | 0169369 A1 | 9/2001 |

OTHER PUBLICATIONS

NIKE: "Nike+ FuelBand", Feb. 2, 2012, pp. 1-26, XP055172474.

*Primary Examiner* — William Titcomb
(74) *Attorney, Agent, or Firm* — Haverstock & Owens LLP

(57) ABSTRACT

The invention relates to a method for scrolling through a list comprising a plurality of selectable items and configured so that a single item in the list is displayed at a given instant on an interface, the display of the next item in the list being triggered by the detection of a scrolling action performed by a user on an input device associated with the interface, the method being such that it has steps of display of an item in the list, of determination that a predetermined item in the list is displayed, and of opening of a period of inactivity of predetermined duration during which scrolling actions on the input device are ignored. The invention likewise relates to a device and a piece of electronic equipment that implement the method for scrolling.

16 Claims, 3 Drawing Sheets

(56) References Cited

U.S. PATENT DOCUMENTS

| | | | |
|---|---|---|---|
| 2007/0024595 A1* | 2/2007 | Baker | G06F 3/03547 345/173 |
| 2007/0080934 A1* | 4/2007 | Chen | G06F 3/0383 345/156 |
| 2008/0168367 A1* | 7/2008 | Chaudhri | G06F 3/04817 715/764 |
| 2008/0168368 A1* | 7/2008 | Louch | G06F 3/048 715/764 |
| 2008/0168382 A1* | 7/2008 | Louch | G06F 9/4443 715/781 |
| 2009/0313567 A1* | 12/2009 | Kwon | G06F 3/0482 715/769 |
| 2009/0325607 A1* | 12/2009 | Conway | G06F 1/1624 455/456.3 |
| 2010/0100839 A1* | 4/2010 | Tseng | G06F 1/1624 715/780 |
| 2010/0175027 A1 | 7/2010 | Young et al. | |
| 2010/0262905 A1* | 10/2010 | Li | G06F 3/0482 715/702 |
| 2011/0055753 A1* | 3/2011 | Horodezky | G06F 3/04883 715/810 |
| 2011/0154263 A1* | 6/2011 | Roulliere | G06F 3/0482 715/830 |
| 2012/0179997 A1* | 7/2012 | Miyazaki | G06F 3/04842 715/830 |
| 2013/0067393 A1 | 3/2013 | Demopoulos et al. | |
| 2013/0290116 A1* | 10/2013 | Hepworth | G06F 3/048 705/14.73 |
| 2014/0109002 A1* | 4/2014 | Kimball | G06F 3/04842 715/800 |

* cited by examiner

METHOD FOR SELECTING AN ITEM IN A LIST

TECHNICAL FIELD

The invention belongs to the field of user interfaces and more particularly concerns a method for scrolling through a list of items on a screen.

PRIOR ART

Today, the miniaturization of electronic devices and notably of wireless communication devices permits the development of numerous objects called "connected objects". These are often conventional objects that have had communication capabilities added. By way of example, they may be a flowerpot that is capable of informing the user when it is necessary to water, a toothbrush geared to transmitting use statistics, a wristband allowing messages to be received or else a watch from which it is possible to take telephone calls. While it is possible today to miniaturize the electronic circuits of such objects, the means for interacting with the users cannot be miniaturized in the same way. By way of example, a smart toothbrush may require means for interaction such that a user is able to configure an association with a terminal by inputting an access code for a wireless network, for example. This requires means for interaction that have a minimum of ergonomics, such as a screen accompanied by an input device. Owing to the small size of some pieces of equipment, the bulk of these means for interaction sometimes needs to be minimized. By way of example, a smart toothbrush may have a small screen that is capable of displaying a few characters and a single button. So that the user is able to look at the various information provided by such a piece of equipment or to configure parameters therefor, a navigation system geared to these minimalist means for interaction needs to be put in place.

Such a piece of equipment often has a menu from which a single item can be displayed on the screen at a given instant owing to the small size thereof. Conventionally, in order to scroll through the various items of a menu on this type of equipment, the user performs an action on the single button. It is thus possible to successively display various items of a menu or various configuration parameters. Some devices allow the user to select an item that is being displayed by pressing for a long duration. According to other modes of operation, the selection is made when the user does not press the button for a certain time. Generally, when a single button is available for going through the various entries of a menu or the configuration parameters, the various items to be gone through are arranged in a circular fashion. Thus, when the user reaches the last item of a menu after successively pressing a navigation button for example, an additional press of this button displays the first item of the menu again.

Some devices moreover have a menu tree. The user is thus able to enter a submenu by selecting an item that is being displayed by means of a long press, the submenu generally having a "return" item for the last position, which allows a return to the main menu. Thus, when the user wishes to exit the submenu, he presses the button successively until the "return" entry is displayed and then makes a selection by means of a long tap.

This mode of the navigation is a compromise that can be found on some pieces of equipment because it allows numerous functionalities to be made accessible through a minimalist interface made up of a small screen and a single button.

Despite everything, this mode of the navigation has a disadvantage.

When the user wishes to reach a particular item in a menu, for example when he wishes to reach the "return" item allowing a return to a main menu, he needs to tap a certain number of times before reaching the sought item. Very often, particularly when the number of items in the menu is large, the user taps rapidly in order to go past the items that are of no interest to him. Now, when the screen is small, it is not impossible to show an item to come and the user may accidentally make one tap too many. Owing to the circular nature of the menu, the user is then forced to go through all of the items in the menu once again in order to try to reach the sought item. The problem is particularly annoying when the number of items is variable because the user does not know how many presses to make in order to reach a specific item. This disadvantage results in the user wasting time, adding increased power consumption for the device, leading to a reduction in its standby time and premature wear on the scroll button.

There is therefore a need for a system for scrolling that does not allow the user to erroneously go past a specific item in a list whose items are displayed successively on a screen.

SUMMARY OF THE INVENTION

To this end, the invention concerns a method for scrolling through a list comprising a plurality of selectable items and configured so that a single item in the list is displayed at a given instant on an interface, the display of the next item in the list being triggered by the detection of a scrolling action performed by a user on an input device associated with the interface, the method being such that it has steps of display of an item in the list, of determination that a predetermined item in the list is displayed, and of opening of a period of inactivity of predetermined duration during which scrolling actions on the input device are ignored.

When the user scrolls through the items in a list by means of successive presses on an input device, the method deactivates scrolling actions for a certain period when a specific item has been reached. By way of example, when using a smartwristband provided with a screen and a single button, a user can denote the $5^{th}$ item in a circular menu having 10 items as a specific item. According to the method, when the user presses the button successively, scrolling of the items in the menu stops temporarily at the 5th position, even if the user makes additional presses of the button. Thus, advantageously, the method allows the user not to erroneously go past a specific item. By preventing the user from having to go through the list again, the method allows a reduction in the interactions between the device and the user, thus allowing power consumption to be reduced and the standby time as well as the life of the device for interaction to be extended.

According to a particular embodiment, the method is such that the interface is configured to display the first item in the list when the scrolling action is detected and the last item in the list is displayed, and the predetermined item is the last item in the list.

The method is thus geared to the last item in a circular list and advantageously allows a return to the first item in the list to be avoided in the event of error and is particularly useful when the list has a variable number of items. By way of example, when the list constitutes a submenu whose last item is an item of "return" type that allows a return to the main menu, the method advantageously avoids, by blocking commands from the user during a predetermined period, having to go through all of the items in the menu again when one or more additional presses of the scroll button are made by mistake.

According to a particular embodiment, the method is such that the period of inactivity is reinitialized when the scrolling action is detected on the input device before expiry of the period.

Each new press of the scroll button during the deactivation period restarts a new period of inactivity. In this way, the scroll function remains ineffective while the user performs scrolling actions at intervals shorter than the deactivation period. The user therefore needs to reach the end of the period in order to be able to activate the scroll command again and move to display of the next item. This embodiment advantageously allows the method to ensure that the user has indeed recognized the fact that the particular item was being displayed before continuing scrolling.

According to a particular embodiment, the method is such that the period of inactivity is immediately terminated when a selection action is detected on the input device.

The user can thus select the displayed item despite deactivation of the scroll command. By way of example, if the scroll command is ineffective following display of a specific item as the "return" item for a submenu, the user can still select the return item in order to return to the main menu by using the selection command. The fact that an item in the menu is selected thus brings about expiry of the deactivation period for scrolling.

According to a particular embodiment, the method is such that the scrolling action is a short tap on the input device The method thus allows rapid scrolling through the various items in a menu by means of a succession of brief presses of a button, while assuring the user that, whatever the number of presses, scrolling will stop on a specific item such as the last item in a menu.

According to a particular embodiment, the method is such that the selection action is a long tap on the input device.

The selection command is separate from the scroll command. It is thus possible for a user to select an item displayed on the screen while the scrolling action is temporarily deactivated following display of a predetermined item such as the last item in a circular menu.

According to another aspect, the invention concerns a device for scrolling through a list comprising a plurality of selectable items and configured so that a single item in the list is displayed at a given instant on a screen of the device, the display of the next item in the list being triggered by the detection of a scrolling action performed by a user on an input device associated with the scrolling device, the device being characterized in that it comprises units for display of an item in the list, for determination that a predetermined item in the list is displayed, and of a clock that is capable of implementing opening of a period of inactivity of predetermined duration during which scrolling actions on the input device are ignored.

According to a particular realization, the invention concerns a piece of electronic equipment comprising a scrolling device as described above.

According to another aspect, the invention concerns a computer program having the instructions for execution of the method for scrolling when the program is executed by a processor.

A last aspect of the invention relates to a computer-readable recording medium on which is recorded a computer program comprising instructions for execution of the steps of the method for scrolling as described above.

The terminals, devices, programs and recording media have advantages similar to those of the corresponding method described above.

LIST OF FIGURES

Other features and advantages of the invention will become more clearly apparent on reading the description below of a particular embodiment, given by way of simple illustrative and nonlimiting example, and the appended drawings, among which:

DESCRIPTION OF A PARTICULAR EMBODIMENT

Figure 1:
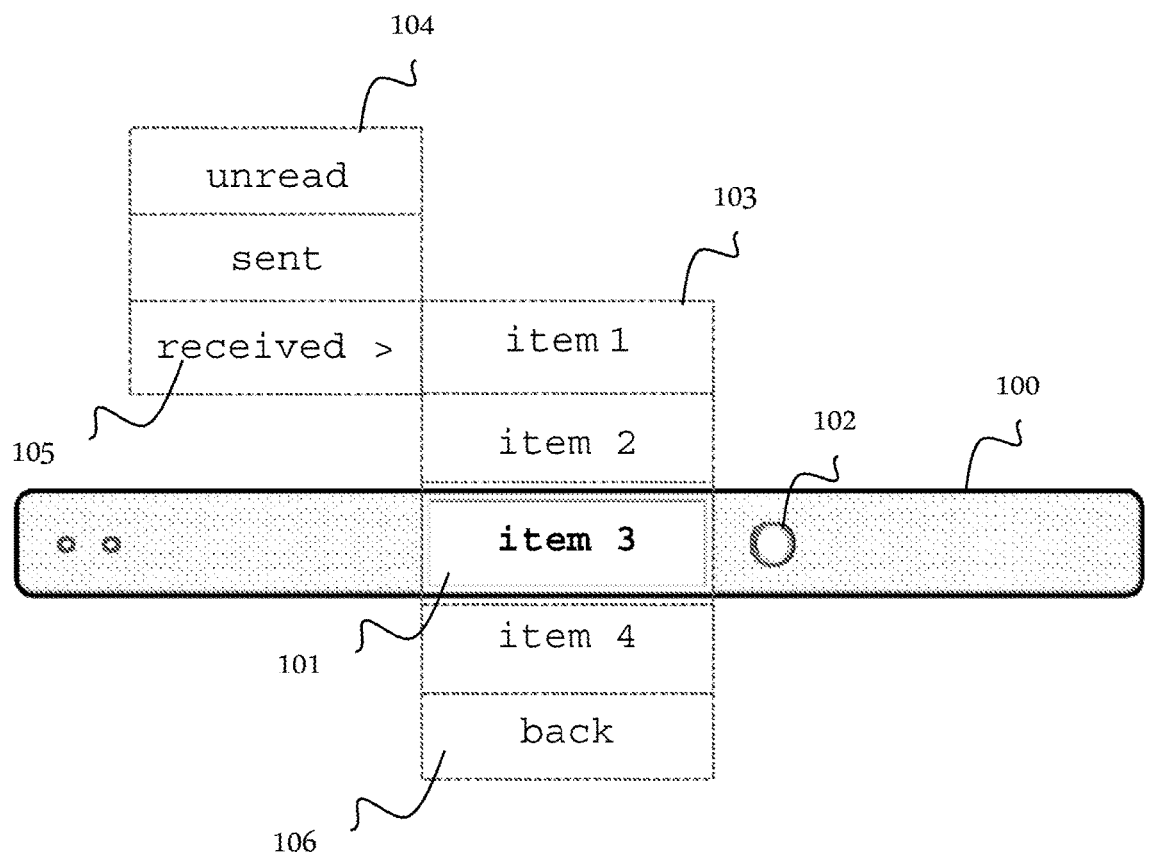
FIG. 1 illustrates a portable device geared to implementing the method for scrolling, according to a particular embodiment of the invention.

The description below takes as an example a portable device of smartwristband type as shown in FIG. 1. This example is given by way of illustration to help to understand the invention, but the invention can be applied in the same way to any sort of equipment having a screen and a device for interaction.

FIG. 1 shows a smartwristband 100 having a screen 101 and a single button 102. Such a wristband can be used to display messages received on an associated mobile telephone, for example. The button 102 is the only means of interaction with the user and is notably used for scrolling through the messages displayed on the screen 101 by means of a succession of short taps, for example, and for selecting an item when it is displayed on the screen.

According to a particular embodiment, the button 102 may have no integration in the device and communicate with the latter via a wireless connection of Bluetooth or WIFI type, for example.

This wristband moreover has a graphical interface that a user can use to look at the various categories of messages. By way of example, the wristband in FIG. 1 has a main menu 104, having entries for looking at unread messages, sent messages or else, by way of example, received messages.

Conventionally, the user can go through the various entries in this menu by making short successive presses of the button 102, each press displaying the next entry on the screen. Still conventionally, when a short press is made on the button 102 while the last item in the menu is displayed, the device displays the first item in the list again. By way of example, when the wristband shown in FIG. 1 is initialized, the "unread" menu item is displayed. When a short press is detected on the button 102, the "sent" item is displayed. Another press displays the last item in the menu, "received". At this stage, if the user makes another press of the button, it is the "unread" item that is displayed again because the menu is implemented in a circular manner.

In order to access the content of the displayed section, the user makes a long tap on the button 102, for example. By way of example, by making a long tap while the entry 105 ("received") is displayed on the screen, the user of the wristband accesses the list 103 of received messages. He can then go through this list by means of short successive presses of the button 102, with a short press of the button 102 while the last item is displayed prompting the return to the start of the list.

The last item in the list of received messages is an item 106 ("back") that allows a return to the main menu. Thus, when the user has finished looking at a message, he makes a certain number of short taps until he reaches the item allowing a return to the main menu and then, when this item is displayed, he makes a long tap in order to return to the main menu. By way of example, in the situation shown in FIG. 1, in which the item "item 3" is being displayed, the user must make 2 short taps in order to reach the last item in the list and then one long tap in order to return to the main menu. Unfortunately, the user does not always know in advance how many presses to make in order to reach the last item in the list because the number of items can vary. Furthermore, the number of items may be relatively high and a large number of presses of the button 102 may turn out to be necessary in order to reach the last item.

In this situation, it is often the case that the user makes rapid presses of the button in order to scroll through the items and reach a specific entry without wasting time. Unfortunately, despite attention being paid to the items that are scrolling on the screen, it is frequently the case that the user makes one press too many, prompting a return to the start of the list and forcing him to scroll through all the items again to the one that is sought. This annoyance wastes time for the user and brings about increased power consumption for the device, leading to a reduction in the standby time thereof and premature wear on the scroll button.

The wristband represented here and according to the invention allows, during a predetermined period, scrolling actions performed on the button 102 when the item 106 is displayed to be ignored. In this way, the item 106 continues to be displayed on the screen even if the user makes several additional taps on the button 102.

Figure 2:
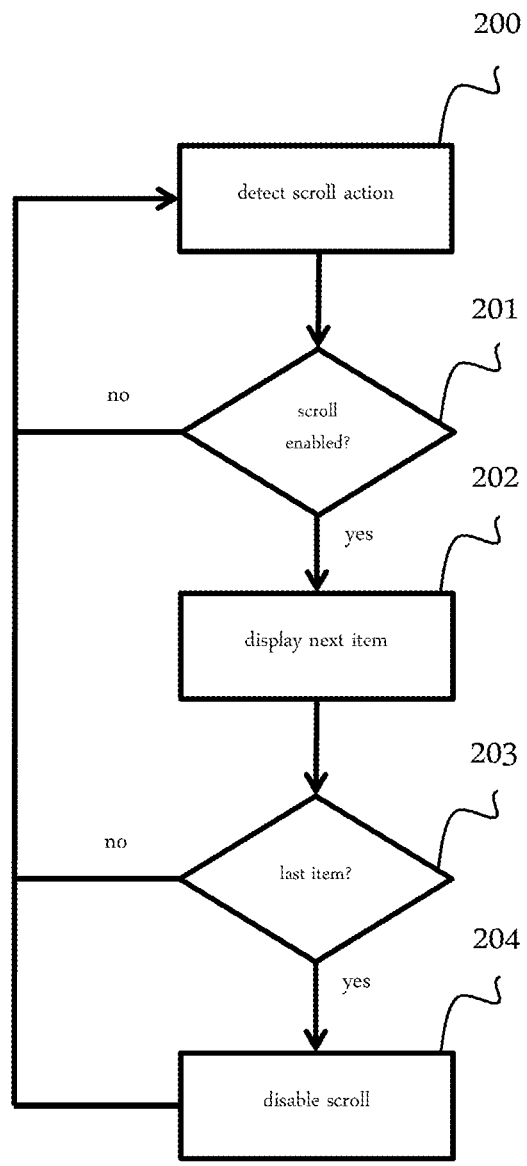
FIG. 2 illustrates the main steps of the method for scrolling according to a particular embodiment of the invention.

FIG. 2 shows the main steps of the method for scrolling according to a particular embodiment of the invention. When the wristband is initialized, an item in a list is displayed on the screen of the device. It may be an item that is displayed by default, such as the first item in a menu or the last message received in the case of a wristband as described with reference to FIG. 1.

When the user operates an input device associated with the display, he can control a scrolling action in order to display another menu item on the screen, for example. By way of example, when the item "item 3" in the submenu 103 described with reference to FIG. 1 is displayed on the screen, the user can make a short tap on a button such as the button 102 in order to display the item "item 4" in the submenu 103. This action by the user is detected in a step 200 and prompts display of the next item in step 202. According to a particular embodiment, the action by the user is a scrolling action triggered by a short tap on an input device associated with the device. By way of example, it may be a brief press on a pushbutton or touch button associated with the device.

In a step 203, the device determines whether a predetermined item is displayed. By way of example, this may be a specific item that requires particular attention by the user when it is displayed, such as the item 106 ("back") in the submenu 103 in FIG. 1, which allows a return to the main menu. The fact that an item in a list or in a menu requires particular attention can be stored in a table associated with the structure of the menu stored in a memory of the device, for example.

According to a particular embodiment, the specific item is a favorite item defined by the user through prior configuration. By way of example, if the user regularly uses a specific function of a device such as the wristband described with reference to FIG. 1, he can denote the menu item corresponding to this function as a favorite in a prior configuration step.

According to a particular embodiment, a specific item can be determined automatically by learning from use statistics. By way of example, if analysis of use finds that the user accesses the item 105 ("received") in the menu 104 more often than other items in the menu, this item can be marked as being specific.

According to a particular embodiment, that specific item is the last item in a circular list, the circular list being defined by the fact that the item following the last item is the first item in the list. In this way, the method allows a user to be warned when he is approaching the end of the list before restarting the loop at the first item in this list. This is particularly advantageous when the last item in the list is an item of "return" type that allows a section to be exited because this allows a user to be prevented from having to go through all of the items in the list again when an additional scrolling action has been performed by mistake.

When step 203 determines that a specific item is displayed, the device triggers, in step 204, the opening of a period during which the actions on the input device are ignored so as to prohibit the display of an item other than the specific item that is being displayed. To accomplish this, the device implementing the method according to the invention can trigger a countdown with a predetermined duration, for example one second. By way of example, this countdown can be implemented using a clock that is geared to signaling the start and end of a period. When an action is detected on an input device, the device controls the state of the countdown so that the actions on the input device are ignored while counting is not finished. This period of inactivity during which the actions of the user are ineffective makes it possible to guarantee that the scrolling of the items in the list will stop on certain specific items, even if scrolling actions are performed in excess.

According to a particular embodiment, the period of inactivity is reinitialized when a scrolling action is performed during the period of inactivity. In this way, it is possible to move to the next item only when no scrolling action is performed for a duration corresponding to the period of inactivity. To accomplish this, the device can reload a countdown each time that a scrolling action is detected and a previous period of inactivity has not yet finished, for example.

According to a particular embodiment, only scrolling actions are ignored when a period of inactivity is engaged. Thus, other actions such as a selection action for the displayed item can be taken into account by the device during the period of inactivity. To this end, the device can filter the detected actions so as to ignore scrolling actions (such as short taps on an input device) while taking account of other actions such as selection actions for the item that is being displayed.

According to a particular embodiment, the selection action may consist of a long tap on an input device, for example. In this way, the user can make short presses in order to scroll the items in the menu and a longer press in order to select the item that is being displayed.

Figure 3:
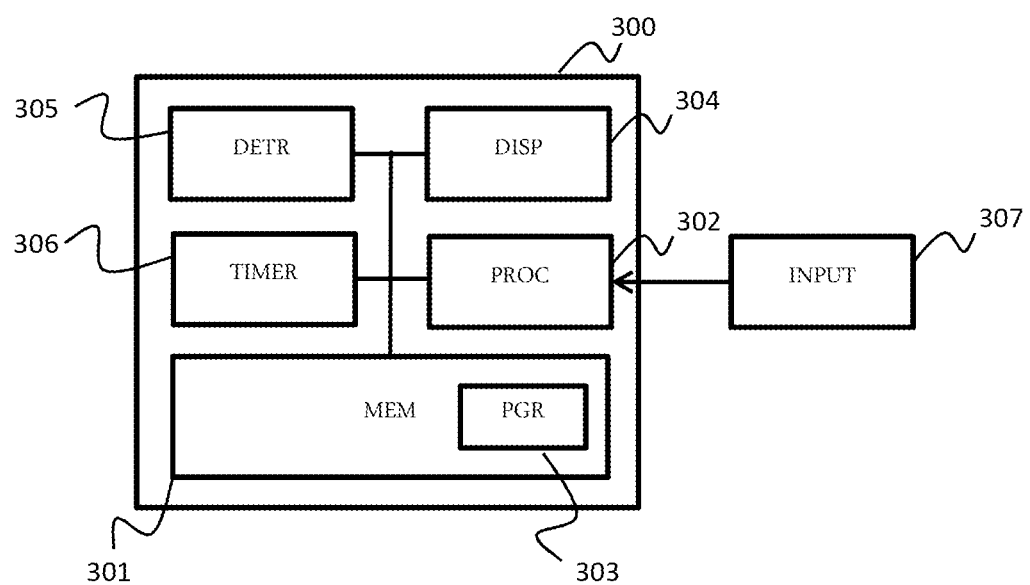
FIG. 3 illustrates the simplified architecture of a device geared to implementing the method for scrolling, according to a particular embodiment of the invention.

FIG. 3 illustrates a device 300 implementing the method for scrolling, according to a particular embodiment of the invention. The device comprises a storage space 301, for example a memory MEM, and a processing unit 302 equipped with a processor PROC, for example. The processing unit can be controlled by a program 303, for example a computer program PGR, implementing the method for scrolling as described in the invention with reference to FIGS. 1 and 2, and notably the steps of display of an item in the list, of determination that a predetermined item in the list is displayed and an opening of a period of inactivity of predetermined duration during which scrolling actions on the input device are ignored.

On initialization, the instructions of the computer program 303 are loaded into a memory RAM (Random Access Memory), for example, before being executed by the processor of the processing unit 302. The processor of the processing unit 302 implements the steps of the method for scrolling according to the instructions of the computer program 303.

To accomplish this, the device comprises, apart from the memory 301, a display unit 304 for an item in a list, such as a screen DISP that is geared to displaying a menu item. The device likewise comprises a unit 305 for determining that a predetermined item is displayed on the screen, and a unit (303) for opening a period of inactivity of predetermined duration during which scrolling actions on the input device are ignored. The unit for opening a period of inactivity may be a clock that is triggered when a predetermined item is displayed, for example. The device additionally comprises an input device 307, such as a pressure-activated INPUT pushbutton, the pressure being able to be variable. The input device 307 may or may not be integrated in the device. When the input device is not integrated in the device, it may be connected thereto by a wired or wireless connection, such as a WIFI, Bluetooth or else infrared connection. The input device may likewise be a touch screen or else a movement sensor of accelerometer type, for example geared to interpreting certain movements as a scrolling action.

According to a particular embodiment, the device may be integrated in a piece of smart equipment of wristband, watch, flowerpot or else toothbrush or smart fork type. According to one embodiment, the device may likewise be integrated in a piece of equipment of electronic cigarette, portable music player, car radio, or any other piece of electronic equipment having a screen and an input device, type.

The invention claimed is:

1. A method for scrolling through a list comprising a plurality of selectable items and configured so that a single item in the list is displayed at a given instant on an interface, the display of the next item in the list being triggered by the detection of a scrolling action performed by a user on an input device associated with the interface, wherein the list comprises at least one specific item, the at least one specific item being automatically marked as being specific by learning from use statistics, and wherein the method comprises:
   displaying an item in the list,
   determining that the at least one specific item in the list is displayed, and
   when the predetermined item is displayed, opening of a period of inactivity of predetermined duration during which scrolling actions on the input device are ignored.

2. The method as claimed in claim 1, wherein the period of inactivity is reinitialized when the scrolling action is detected on the input device before expiration of the period.

3. The method as claimed in claim 2, wherein the selection action is a long tap on the input device.

4. The method as claimed in claim 1, wherein the period of inactivity is immediately terminated when a selection action is detected on the input device.

5. The method as claimed in claim 4, wherein the scrolling action is a short tap on the input device.

6. The method as claimed in claim 4, wherein the scrolling action is a short tap on the input device.

7. The method as claimed in claim 4, wherein the selection action is a long tap on the input device.

8. The method as claimed in claim 1, wherein the scrolling action is a short tap on the input device.

9. The method as claimed in claim 8, wherein the selection action is a long tap on the input device.

10. The method as claimed in claim 1, wherein the selection action is a long tap on the input device.

11. The method as claimed in claim 1, wherein the period of inactivity is reinitialized when the scrolling action is detected on the input device before expiration of the period.

12. The method as claimed in claim 1, wherein the period of inactivity is immediately terminated when a selection action is detected on the input device.

13. The method as claimed in claim 1, wherein the period of inactivity is immediately terminated when a selection action is detected on the input device.

14. The method as claimed in claim 1, wherein the scrolling action is a short tap on the input device.

15. The method as claimed in claim 1, wherein the selection action is a long tap on the input device.

16. A device for scrolling through a list comprising a plurality of selectable items and configured so that a single item in the list is displayed at a given instant on a screen of the device, the display of the next item in the list being triggered by the detection of a scrolling action performed by a user on an input device associated with the scrolling device, wherein the list comprises at least one specific item, the at least one specific item being automatically marked as being specific by learning from use statistics, and wherein the device comprises:
   a screen configured to display of an item in the list,
   a determination unit configured to determine that the at least one specific item in the list is displayed on the screen, and
   a clock configured to open a period of inactivity of predetermined duration during which scrolling actions on the input device are ignored, when the at least one specific item is displayed.

* * * * *